United States Patent [19]

Murayama et al.

[11] Patent Number: 5,128,708
[45] Date of Patent: Jul. 7, 1992

[54] LIGHT SOURCE DISCRIMINATING DEVICE FOR A CAMERA

[75] Inventors: Jin Murayama; Kenji Suzuki, both of Kanagawa, Japan

[73] Assignee: Fuji Photo Film Co., Ltd., Kanagawa, Japan

[21] Appl. No.: 616,500

[22] Filed: Nov. 21, 1990

[30] Foreign Application Priority Data

Nov. 22, 1989 [JP] Japan ................................. 1-304487

[51] Int. Cl.$^5$ ............................................. G03B 7/08
[52] U.S. Cl. ................................. 354/430; 354/105
[58] Field of Search ................ 354/430, 432, 105, 109

[56] References Cited

U.S. PATENT DOCUMENTS

| | | | |
|---|---|---|---|
| 3,850,530 | 11/1974 | Uno et al. | 354/430 |
| 4,041,308 | 8/1977 | Fujita | 354/430 |
| 4,079,388 | 3/1978 | Takahama et al. | 354/430 |
| 4,220,412 | 9/1980 | Shroyer et al. | 354/430 |
| 4,335,943 | 6/1982 | Numata | 354/430 |

Primary Examiner—Russell E. Adams
Attorney, Agent, or Firm—Sughrue, Mion, Zinn, Macpeak & Seas

[57] ABSTRACT

A light source discriminating device for use with an image taking apparatus, e.g. a photographic camera, judges whether a bright line having a particular wavelength exists in the light source illuminating a scene to be taken, in order to judge whether the light source is to be a fluorescent lamp. When the light source is judged not to be a fluorescent lamp, then it is determined whether the light source is a tungsten lamp. According to a preferred embodiment, a band-pass filter is used to transmit only a component of a particular frequency range in an output of a photosensor. When the transmitting ratio of the component of the photosensor output is not less than a predetermined value, then the light source is judged to be a tungsten lamp. In flash photography, an object brightness is measured in order to judge that daylight synchronized flash photography is effected if the measured object brightness is not less than a predetermined value. In the preferred embodiment, it is judged, from the time the scene is taken, whether the scene is taken in early evening, in order to prevent an image from being reproduced in a changed color, because the color temperature of the daylight is low. Similarly, it is judged from the day of taking the scene in the year whether the scene is taken in the winter, for the same reason. The resulting judgment data are recorded on a recording medium, e.g. photographic film, in bar code form.

23 Claims, 5 Drawing Sheets

LIGHT SOURCE DISCRIMINATING DEVICE FOR A CAMERA

BACKGROUND OF THE INVENTION

The present invention relates to a device for discriminating a light source illuminating a scene to be taken for use with a silver halide photographic camera, an electronic still camera, a video camera and the like. More particularly, the invention relates to a device which can discriminate a light source exactly at the time of taking the scene.

A scene to be taken is illuminated natural light, i.e. daylight, or by an artificial light such as a tungsten lamp, a fluorescent lamp, or a flash. Color reproduction is influenced by various characteristics of the light source, including color temperature spectral characteristics, and the like. Several methods have been known for reproducing the color of the object in an unchanged manner by removing the effect of the kind of light source. According to a conventional light source discriminating method in the field of silver halide photography, for example, the image recorded on a photographic film is subjected to photometry by a scanner mounted on a photographic printer in order to detect the color distribution from the three color photometric values thus obtained from each point. If the color distribution is regarded as a pattern peculiar to the fluorescent lamp, then the light source is judged to be a fluorescent lamp. If the distribution is regarded as a pattern of the tungsten lamp, the light source is judged to be a tungsten lamp. A color correction value is determined in accordance with the type of light source.

In a video camera or an electronic still camera, the white balance is adjusted to remove the influence of the color temperature of the light source. The gain values of the red and blue channels are adjusted while picking up a white object illuminated by light of the standard color temperature so that it is picked up electrically to be the achromatic color.

However, in the above-described method, in silver halide photography for discriminating a light source on the basis of color distribution, it is difficult to judge whether the color distribution is influenced by the illumination of the light source, or is dependent on the color of the object itself. The color also becomes different depending on the characteristic of the photographic film, so that the light source cannot be detected exactly. Even according to color correction by adjusting the white balance, the color of the reproduced image becomes different from that of the object under the influence of the spectral characteristics of the light source while the white balance is adjusted appropriately.

SUMMARY OF THE INVENTION

Therefore, it is an object of the present invention to provide a device for discriminating a light source exactly at the time of taking a scene in order to make it possible to reproduce an image by taking into account the spectral characteristics as well as the color temperature of the light source.

In order to achieve the above and other objects and advantages of this invention, a light source discriminating device is constituted by a first photometry device for measuring light at a wavelength corresponding to a bright line in light of a fluorescent lamp, and a judgment unit for judging whether the light source illuminating a scene is a fluorescent lamp on the basis of an output of the first photometry device. In a preferred embodiment, the judgment unit includes a second photometry device for measuring light from a field including the scene, a first calculating device for calculating a ratio $\alpha$ between outputs from the first and second photometry device; and a first judgment device for judging that the light source illuminating the scene is a fluorescent lamp if $\alpha \geq \alpha_1$, where $\alpha_1$ is a predetermined value.

The light source discriminating device further includes another photometry device similar to the second photometry device, a band-pass filter for passing a component of an output from the other photometry device within a predetermined frequency band, a second calculating device for calculating a ratio $\beta$ between outputs from the second photometry device and the band-pass filter; and second judgment means for judging that the light source illuminating the scene is a tungsten lamp if $\beta \geq \beta_1$, where $\beta_1$ is another predetermined value.

The light source discriminating device further includes apparatus for detecting actuation of an electronic flash device emitting a flash in order to illuminate the scene, apparatus for judging that the scene is taken in daylight synchronized flash photography if comparison of an output A of the photometry device with a predetermined value $A_1$ results in $A \geq A_1$ when the detecting apparatus detects actuation of the electronic flash device.

The light source discriminating device also includes a clock for specifying when the scene is taken, and apparatus for judging whether the time of the scene specified by the clock is within a predetermined time zone.

The light source discriminating device also may include a calendar for specifying a day of the year when the scene is taken, and a device for judging whether the day of the year specified by the calendar is within a predetermined term of the year.

In accordance with the present invention, a fluorescent lamp and a tungsten lamp as light source can be detected exactly by judging whether the light source contains a bright line peculiar to the fluorescent lamp and thus is a fluorescent lamp, and by inspecting the intensity of the component of the light from 50 to 120 Hz or the fluctuation of the light source to judge whether the light source is a tungsten lamp. Low brightness object flash photography and daylight synchronized flash photography can be detected exactly and can be discriminated by judging whether the electronic flash device is actuated and whether the light from the scene is very bright. Further, the scene in the early evening or in winter can be discriminated by referring to the time and day of taking the scene.

BRIEF DESCRIPTION OF THE DRAWINGS

The above objects and advantages of the present invention will become more apparent from the following detailed description when read in connection with the accompanying drawings in which.

DETAILED DESCRIPTION OF THE PREFERRED EMBODIMENTS

Figure 1:
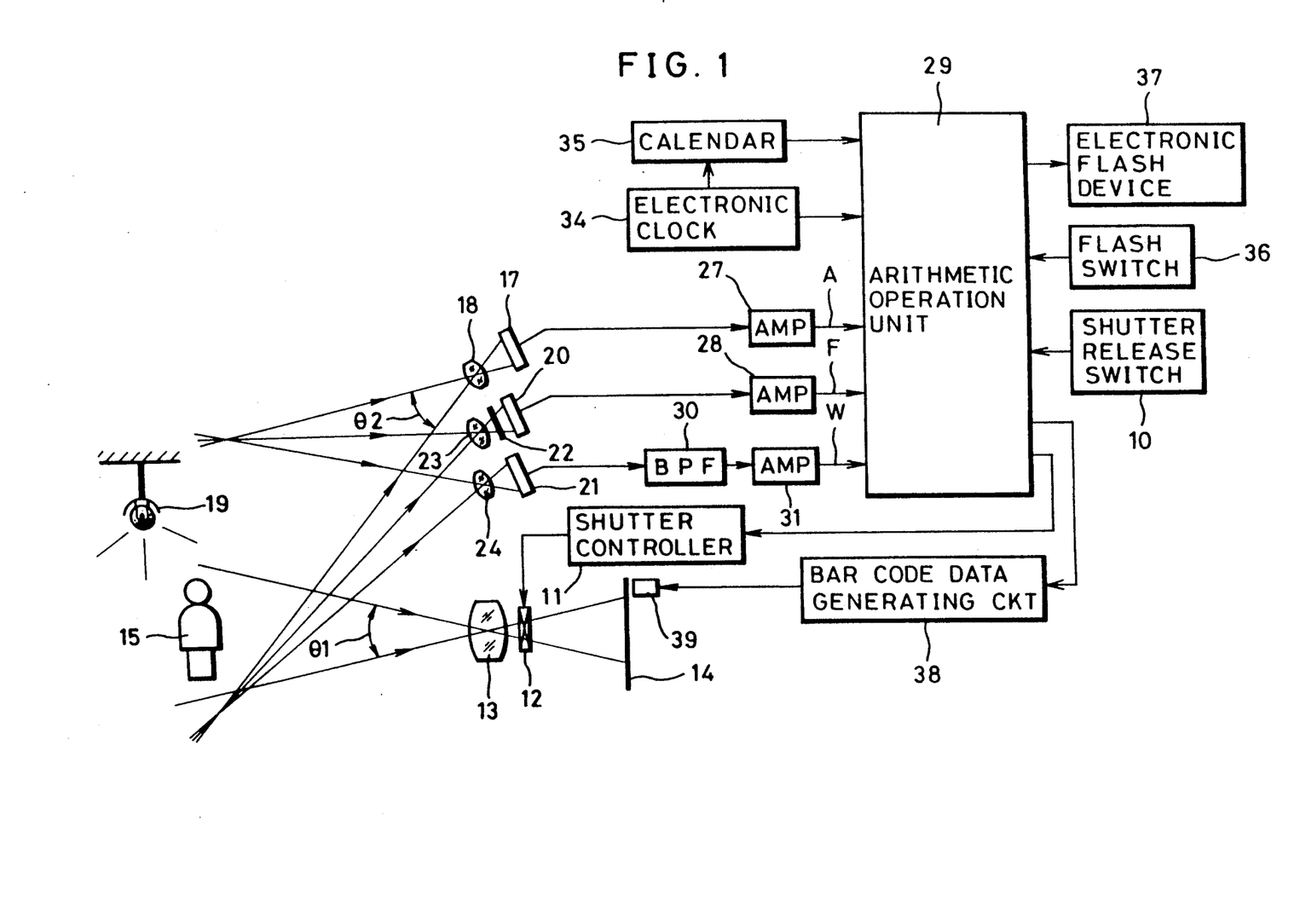
FIG. 1 is a schematic diagram illustrating a silver halide photographic camera incorporating the light source discriminating device of the present invention.

In FIG. 1, schematically illustrating a photographic camera, a shutter release switch 10 is actuated by pressing a shutter release button (not shown) so as to operate a shutter 12 through the control of a shutter controller 11. While the shutter 12 is open the light passing through a taking lens 13 is incident on a photographic film 14, such as negative film, to record a latent image of an object 15 on to the film 14.

A photosensor 17 is arranged on the front side of a camera body (not shown) for photoelectrically converting the light incident thereon through a lens 18. The acceptance angle $\theta 2$ of the photosensor 17 is set to be larger than the angle $\theta 1$ of view of the taking lens 13 for receiving light from a large field including a scene to be taken. Even if the object 15 is illuminated by a light source 19 existing outside the scene to be taken, the photosensor 17 can measure the direct illumination from the light source 19.

Figure 2:
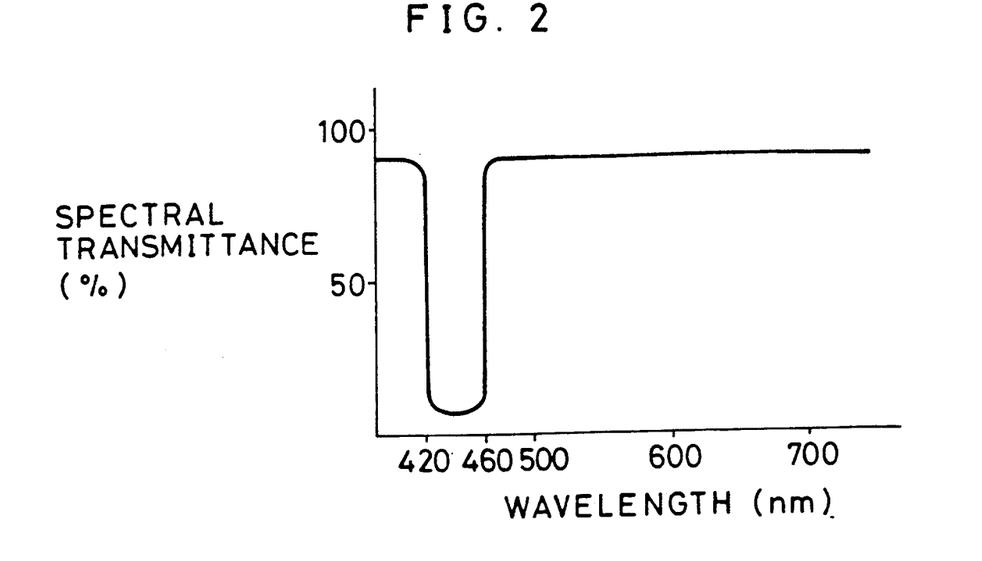
FIG. 2 is a graph illustrating the characteristic of the color filter illustrated in FIG. 1 for detecting a bright line of the fluorescent lamp.

Photosensors 20 and 21 are provided similarly for measuring the light from the field including the scene. A color filter 22 having a spectral transmittance illustrated in FIG. 2 is arranged in front of the photosensor 20 for transmitting the light component corresponding to a bright line peculiar to the fluorescent lamp, e.g. light having a wavelength of 436 nm. Lenses 23 and 24 are disposed in front of the photosensors 20 and 21 to define the acceptance angle $\theta 2$ of the photosensors 20 and 21. These photosensors 17, 20, and 21 may be provided monolithically.

The output from the photosensor 17 is amplified in an amplifier 27. The amplified signal A is sent to an arithmetic operation unit 29 to be used for discriminating a light source and controlling the exposure. The output from the photosensor 20 is amplified in an amplifier 28. The amplified signal F is sent to the arithmetic operation unit 29. The output from the photosensor 21 is entered in a band-pass filter 30 for transmitting only the signal component within the frequency band from 50 to 120 Hz. The signal outputted from the band-pass filter 30 is amplified in the amplifier 31. The thus amplified signal W is forwarded to the arithmetic operation unit 29. The output terminal of the photosensor 17 may be connected to the band-pass filter 30 so as to omit the photosensor 21 and the lens 24 by the dual use of the photosensor 17 and the lens 18.

An electronic clock 34 is provided in the camera to discriminate the scene during a time when the day light is low in color temperature and thus is rather reddish, e.g. in early evening before sunset. The electronic clock 34 sends the signal identifying this point in time to the arithmetic operation unit 29. A calendar 35, connected to the electronic clock 34 to specify the season of winter through the year, sends a signal identifying the specified day of the year to the arithmetic operation unit 29. It is preferable that the early evening time period be varied according to the day specified by the calendar 35, since the decrease in the color temperature of daylight varies depending on different seasons.

An electronic flash switch 36 is switched on for a low brightness object or in daylight synchronized flash photography. When the flash switch 36 is on, an electronic flash device 37 emits light in synchronism with the operation of the shutter 12. It is noted that the flash device 37 may be actuated automatically by a detection signal such that a rear light scene is detected by carrying out multiple photometry, or that a low brightness object is detected by measuring the output of the photosensor 17.

The arithmetic operation unit 29 discriminates the kind of light source in consideration of the signals A, F, and W, the time, the day of the year, and the presence/absence of the flash. The arithmetic operation unit 29 sends the discrimination result to a bar code data generating circuit 38, which converts data as to the light source into bar code data to be sent to a bar code recording mechanism 39. The bar code recording mechanism 39 is constructed of a liquid crystal display panel and a lamp, for example, and records the light source data in bar code form on the back surface of the film 14. The bar code data may be recorded while transporting the film 14 frame by frame. This simplifies the construction of the bar code recording mechanism 39, as it is sufficient that the bar code recording mechanism 39 displays one bar at a time. It also is noted that the light source data may be recorded as a numeral, a character, or a mark instead of the bar code.

Figure 3:
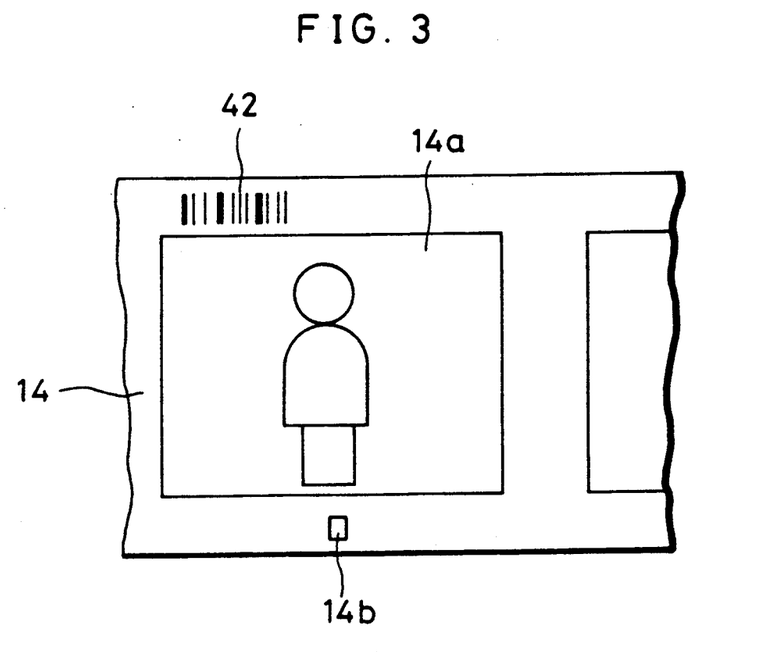
FIG. 3 is an explanatory view illustrating a photographic film with light source data recorded thereon by the camera in FIG. 1.

In FIG. 3, illustrating the film 14 with light source data recorded thereon data 42 representing the light source of the frame 14a in bar code are recorded on the film 14 outside the frame 14a. A perforation 14b defines the frame transporting amount.

The operation of the above embodiment now will be described. When a camera is directed to an object, the photosensors 17 and 21 receive the light from the field including the object, with the photosensor 20 receiving the light at a wavelength corresponding to a bright line in the fluorescent light through the color filter 22. The outputs from the photosensors 17 and 20 are amplified in the amplifiers 27 and 28. The amplified signals A and F are entered into the arithmetic operation unit 29. The output from the photosensor 21 is processed in the band-pass filter 30 to extract the signal component of the frequency from 50 to 120 Hz. The output from the band-pass filter 30 is amplified in the amplifier 31. The amplified signal W is entered in the arithmetic operation unit 29.

The actuation of the release button switches on the release switch 10. Upon the activation of the release switch 10, the arithmetic operation unit 29 receives the signals A, F, and W, and first determines an exposure value according to the signal A, then actuates the shutter 12 by means of the shutter controller 11, and controls the shutter 12 following a program control according to the exposure value, while the shutter 12 is open, the image of the object 15 is recorded on the film 14.

When the object has a low brightness, as for example at night or in a rear light scene, the flash switch 36 is set at the ON position. With the flash switch 36 on, the flash device 37 is actuated to illuminate the object 15 in synchronism with the shutter 12.

After photo-taking the arithmetic operation unit 29 discriminates the light source on the basis of the signals A, F, and W, the time specified by the electronic clock 34, the day specified by the calendar 35, and the presence/absence of the actuation of the flash device 37. The light source data is converted into a bar code by the bar code data generating circuit 38, and is sent to the bar code recording mechanism 39. The light source data 42 indicated in the bar code are recorded on the film 14.

Figure 4:
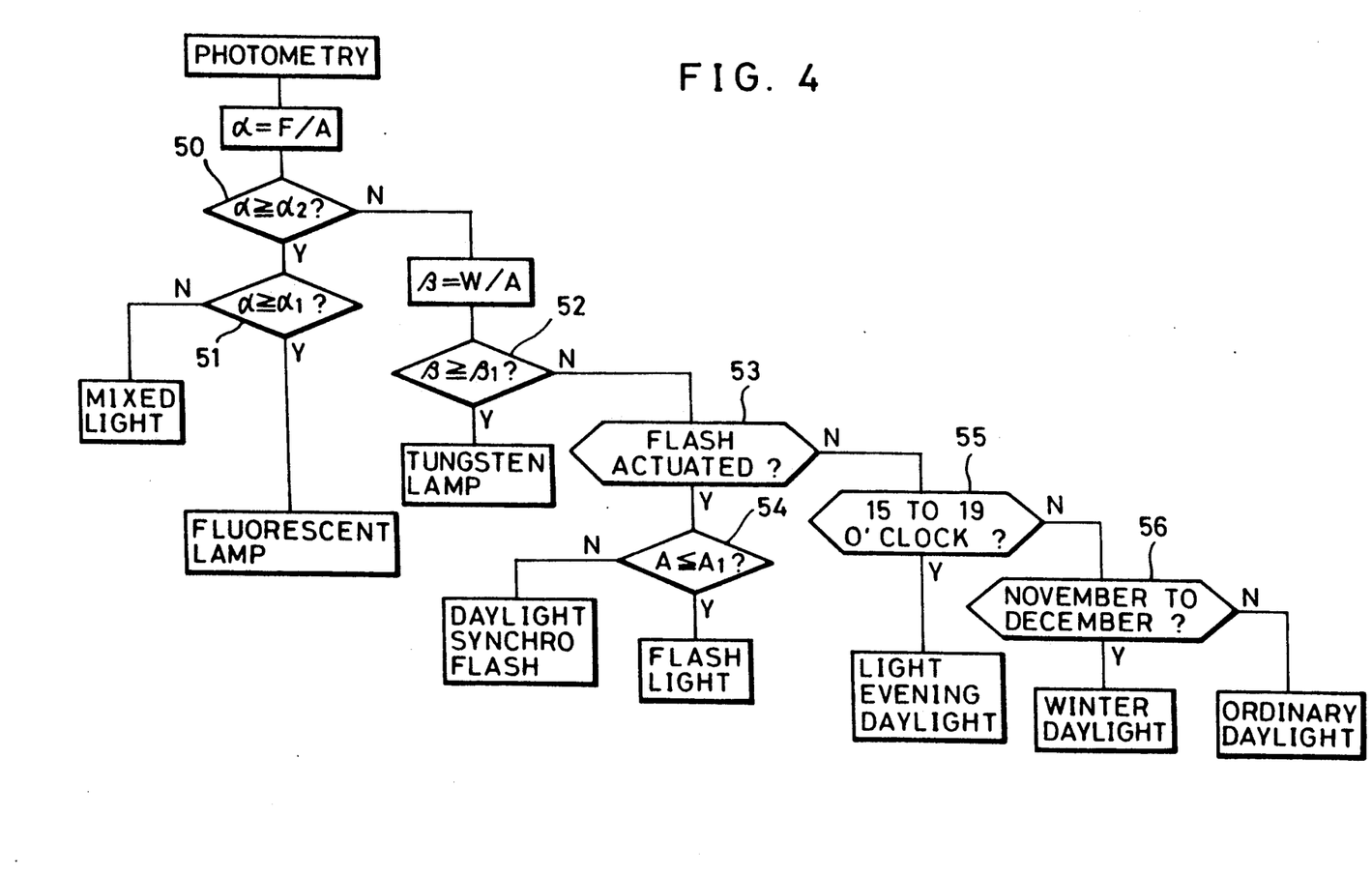
FIG. 4 is a flowchart illustrating a process for discriminating the light source by means of the device in FIG. 1.

The discrimination of the light source now will be described with reference to FIG. 4. The arithmetic operation unit 29 calculates the ratio $\alpha$ of the signal F to the signal A. If the condition $\alpha \geq \alpha_2$ is satisfied at the judgment step 50, then it is judged whether the condition $\alpha \geq \alpha_1$ is satisfied at the judgment step 51, where $\alpha_1$ and $\alpha_2$ are threshold values which are obtained experimentally with $\alpha_1 > \alpha_2$. If $\alpha \geq \alpha_1$, then the light source of the scene is judged to be a fluorescent lamp. If $\alpha < \alpha_1$, then the light source is judged to be a mixture of a fluorescent light with another light source.

If $\alpha < \alpha_2$ at the judgment step 50, then the ratio $\beta$ of the signal W to the signal A is calculated. If the condition $\beta \geq \beta_1$ is satisfied at the judgment step 52, where $\beta_1$ is a threshold value, then the light source of the scene is judged to be a tungsten lamp.

If $\beta < \beta_1$, then at judgment step 53 it is judged whether the flash device 37 has been actuated. If the flash device 37 is judged to have been actuated, then it is judged, at judgment step 54, whether a condition $A \leq A_1$ is satisfied as to the discrimination of a low brightness object, in which $A_1$ is a threshold value. If $A \leq A_1$, then the light source is judged to be a flash.. If $A > A_1$, then it is judged that daylight synchronized flash photography is carried out.

If the flash has not been actuated at the judgment step 53, then it is judged, at judgment step 55, whether the photo-taking time is between 15 to 19 o clock (3pm to 7pm). If the time is in this time zone, then the light source is judged to be the daylight before sunset since this time zone corresponds to early evening.

If the light source is judged to be daylight before sunset, then it is judged at the judgment step 56 whether the photo-taking day is in November or December. If the day is in these months, then the scene is judged to be taken in the winter. If the day is not in these months, then the scene is judged to be illuminated by ordinary daylight.

The light source data thus discriminated in the above process are converted into a code, and are recorded on the film 14 in a form of bar code. Upon completing photo-taking with the film of one cassette, the film is developed and is set at a photographic printer so as to print each frame of image on color paper. The photographic printer is provided with a bar code reader for reading the light source data 42 recorded for each frame. The printer determines a color correction amount in accordance with the light source data 42. The color correction according to the detected light source is effected to improve the color reproduction by removing the influence of the light source. Conventionally, the image would be reproduced under correction in rather a yellowish manner at the time of day or year when the daylight is low in color temperature. The present invention can prevent such a change in color.

Figure 5:
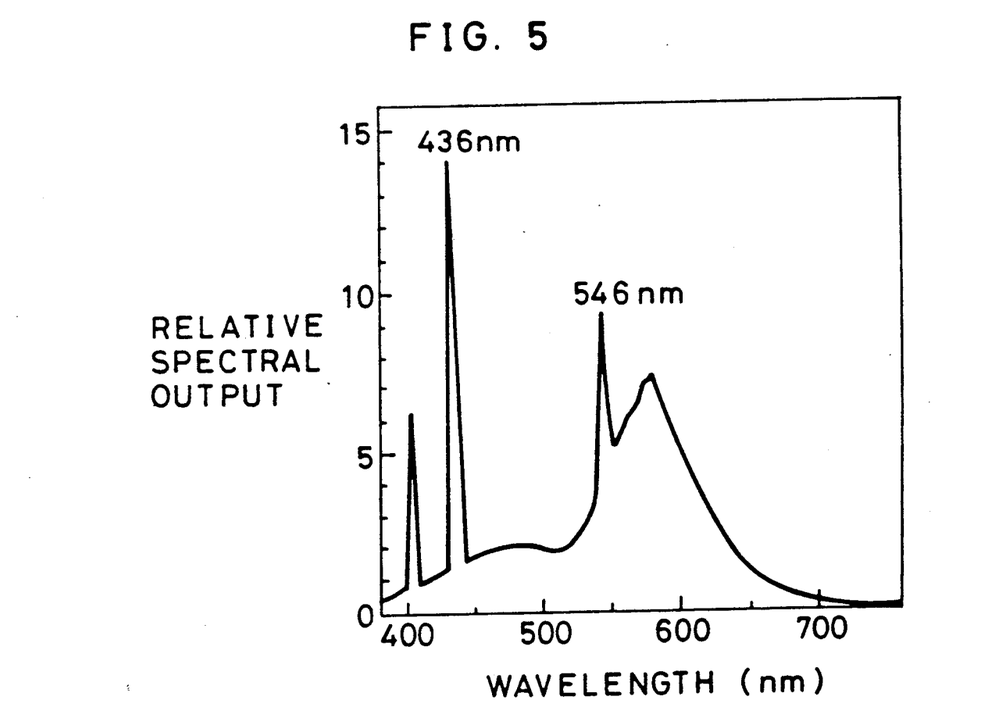
FIG. 5 is a graph illustrating the spectral intensity of the fluorescent lamp.
Figure 6:
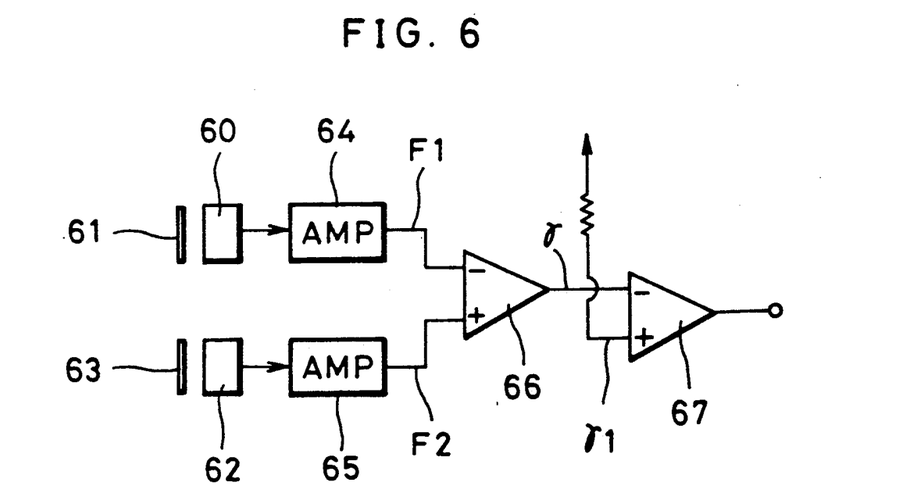
FIG. 6 is a circuit diagram illustrating another embodiment for detecting a fluorescent lamp.

As shown in FIG. 5, the light of the fluorescent lamp has bright lines at the wavelengths of 436 nm and 546 nm which are peculiar to this light. The light source can be judged to be a fluorescent lamp by examining the ratio between the light of one of the two bright lines and the light at a certain wavelength different from the bright lines. In FIG. 6 illustrating another embodiment of the circuit for detecting the illumination of fluorescent lamp, a color filter 61, disposed in front of a photosensor 60, transmits only the light at the wavelength of 436 (or 546) nm corresponding to the bright line of the fluorescent light. A color filter 63, arranged in front of a photosensor 62 transmits only the light at a wavelength 50 to 100 nm longer or shorter than 436 nm. The outputs from the photosensors 60 and 62 are amplified by amplifiers 64 and 65, from which signals F1 and F2 are sent to a differential amplifier 66. The differential amplifier 66 calculates a difference $\gamma$ between the two signals F1 and F2 ($\gamma = F1 - F2$). The difference signal $\gamma$ is sent to a comparator 67 and compared with a threshold value $\gamma_1$. If $\gamma \geq \gamma_1$, then the light source of the scene is judged to be a fluorescent lamp.

Figure 7:
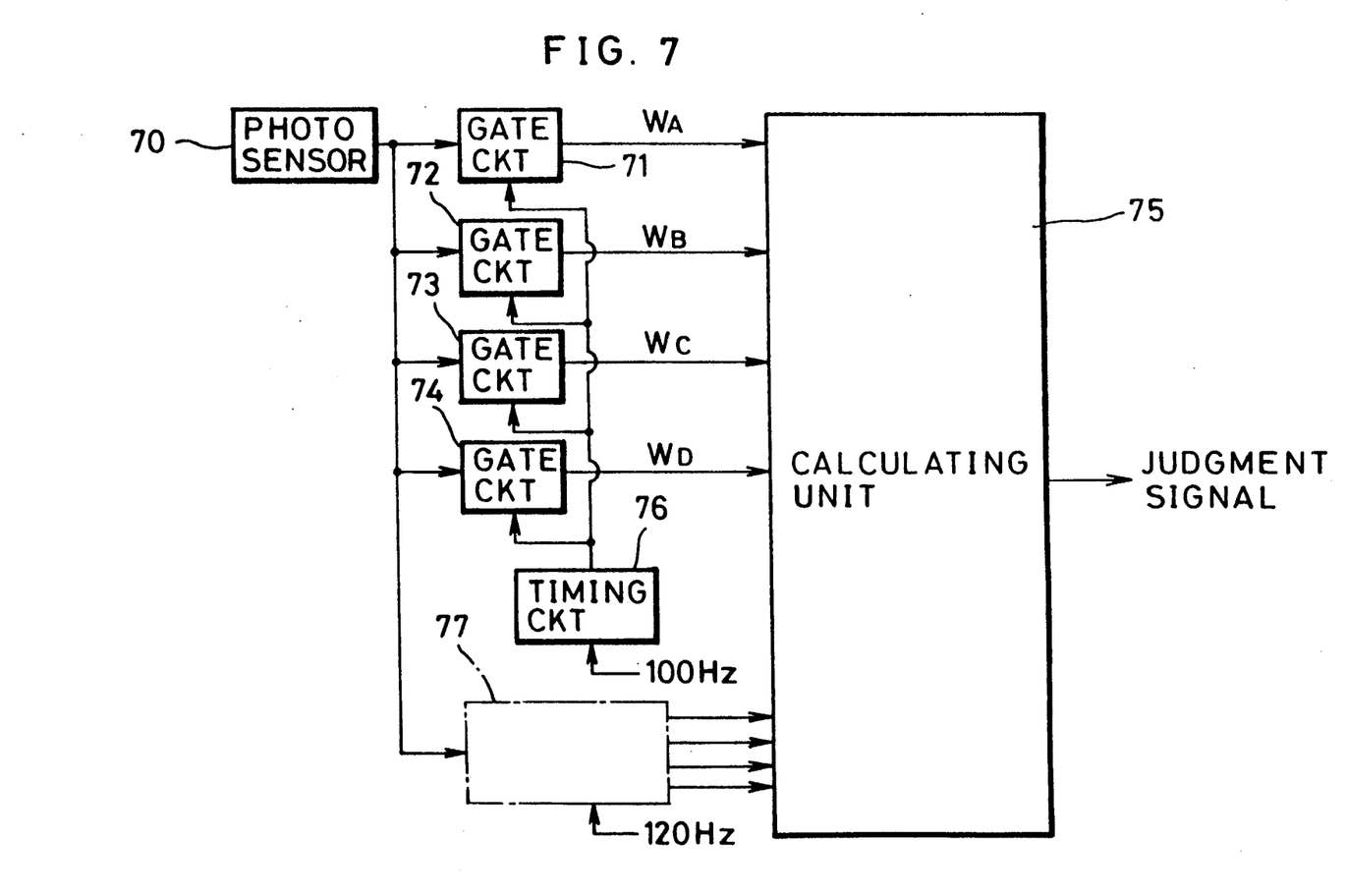
FIG. 7 is a block diagram illustrating another embodiment for detecting a tungsten lamp.

FIG. 7 illustrates another embodiment of the circuit for detecting the light source of a tungsten lamp by use of its fluctuation. The signal from a photosensor 70 is entered to gate circuits 71 to 74. When the gate circuits 71 to 74 are open, signals $W_A$ to $W_D$ are outputted respectively to a calculating unit 75. The opening and closing of gate circuits 71 to 74 are controlled by a timing circuit 76 outputting four gate pulse signals, which have a frequency of 100 Hz and phases which are 90 degrees displaced one from another.

The calculating unit 75 judges the light source to be a tungsten lamp, if a difference between two of the signals having a 90 degree phase displacement is larger than a predetermined threshold value $\delta_1$. Since the fluorescent lamp as a practical matter, has a fluctuation as well, judgment is made whether the light source is a tungsten lamp if it has been judged not to be a fluorescent lamp, by the equations:

$$W_A - W_C \geq \delta_1,$$

or $$W_B - W_D \geq \delta_1.$$

The value of 100 Hz corresponds to a fluctuation in a light source when a commercial AC power source of 50 Hz is used. Another type of commercial AC power source in Japan has a frequency of 60 Hz, in which case the fluctuation in a light source is at 120 Hz. In order to detect the fluctuation at 120 Hz, the present tungsten lamp detecting circuit also is provided with another signal processing circuit 77 consisting of four gate circuits and a timing circuit. Accordingly, a fluorescent lamp is detected when satisfying one of the four equations. i.e. the two equations for the 50 Hz power source and two other equations for the 60 Hz power source.

Although the above description refers to a silver halide photographic camera, the present invention also can be used for an electronic still camera or a video camera. In these cameras, the light source is discriminated while picking up the scene to subject the video signal from a pick-up device to a color correcting calculation according to the kind of light source.

While the invention has been described in detail above with reference to a preferred embodiment, various modifications within the scope and spirit of the invention will be apparent to people of working skill in this technological field. Thus, the invention should be considered as limited only by the scope of the appended claims.

What is claimed is:

1. A light source discriminating device for use with an image taking apparatus for recording a scene on a recording medium, said device comprising:

first photometry means for measuring light at a wavelength corresponding to a bright line from a light of a fluorescent lamp; and a judgment unit for judging whether the light source illuminating said scene is a fluorescent lamp on the basis of an output of said first photometry means, wherein said judgment unit includes:

an additional photometry means for measuring light at a wavelength different from at least two bright lines from a light of a fluorescent lamp;

means for calculating a difference $\gamma$ between outputs from said first and said additional photometry means; and means for judging that the light source illuminating said scene is fluorescent lamp if $\gamma \geq \gamma_1$, where $\gamma_1$ is a predetermined value.

2. A light source discriminating device for use with an image taking apparatus for recording a scene on a recording medium, said device comprising:

first photometry means for measuring light at a wavelength corresponding to a bright line from a light of a fluorescent lamp; and a judgment unit for judging whether the light source illuminating said scene is a fluorescent lamp on the basis of an output of said photometry means, wherein said judgment unit includes:

second photometry means for measuring light from a field including said scene;

first calculating means for calculating a ratio $\alpha$ between outputs from said first and second photometry means; and first judgment means for judging that the light source illuminating said scene is a fluorescent lamp when $\alpha \geq \alpha_1$, where $\alpha_1$ is a predetermined value, further comprising:

third photometry means for measuring light;

a band-pass filter for passing a component of an output from said third photometry means within a predetermined frequency band;

second calculating means for calculating a ratio $\beta$ between outputs from said second photometry means and said band-pass filter; and second judgment means for judging that the light source illuminating said scene is a tungsten lamp if $\beta \geq \beta_1$, where $\beta_1$ is a predetermined value.

3. A light source discriminating device as defined in claim 2, wherein said predetermined frequency band of an output component passed through said band-pass filter is between 50 and 120 Hz.

4. A light source discriminating device as defined in claim 2, further comprising:

means for detecting actuation of an electronic flash device emitting a flash in order to illuminate said scene; and third judgment means for judging that said scene is taken in daylight synchronized flash photography if comparison of an output A of said second photometry means with a predetermined value $A_1$ results in $A \geq A_1$ when said detecting means detects actuation of said electronic flash device.

5. A light source discriminating device as defined in claim 4, further comprising:

a clock for specifying a time when said scene is taken; and fourth judgment means for judging whether said time specified by said clock is within a predetermined time zone.

6. A light source discriminating device as defined in claim 5, wherein within said time zone a color temperature of daylight is low.

7. A light source discriminating device as defined in claim 6, wherein said time zone is set to be early evening before sunset.

8. A light, source discriminating device as defined in claim 6, further comprising:

calendar means for specifying a day of the year when said scene is taken; and means for changing said time zone in correlation with said day of the year specified by said calendar means.

9. A light source discriminating device as defined in claim 8, further comprising fifth judgment means for judging whether said day of the year specified by said calendar means is within a predetermined term of the year.

10. A light source discriminating device as defined in claim 9, wherein during said term a color temperature of daylight is low.

11. A light source discriminating device as defined in claim 10, wherein said term is set to be the season of winter.

12. A light source discriminating device for use with an image taking apparatus for recording a scene on a recording medium, said device comprising:

first photometry means for measuring light at a wavelength corresponding to a bright line from a light of a fluorescent lamp; and a judgment unit for judging whether the light source illuminating said scene is a fluorescent lamp on the basis of an output of said first photometry means, wherein said judgment unit includes:

second photometry means for measuring light from a field including said scene;

first calculating means for calculating a ratio $\alpha$ between outputs from said first and second photometry means; and first judgment means for judging that the light source illuminating said scene is a fluorescent lamp when $\alpha \geq \alpha_1$, where $\alpha_1$ is a predetermined value, further comprising:

a band-pass filter for passing a component of an output from said second photometry means within a predetermined frequency band;

second calculating means for calculating a ratio $\beta$ between outputs from said second photometry means and said band-pass filter; and second judgment means for judging that the light source illuminating said scene is a tungsten lamp if $\beta \geq \beta_1$, where $\beta_1$ is a predetermined value.

13. A light source discriminating device as defined in claim 12, wherein said recording medium is photographic film on which judgment data from said judgment unit are recorded.

14. A light source discriminating device as defined in claim 13, wherein said judgment data are recorded in a form of bar code.

15. A light source discriminating device as defined in claim 12, further comprising:

means for detecting fluctuation in a light source supplied with an AC power source; and means for judging whether a light source illuminating said scene is a tungsten lamp on the basis of an output of said detecting means.

16. A light source discriminating device for use with an image taking apparatus for recording a scene on a recording medium, said device comprising:

means for detecting actuation of an electronic flash device emitting a flash in order to illuminate said scene;

photometry means for measuring light from said scene; and means for judging that said scene is taken in daylight synchronized flash photography if comparison of an output A of said photometry means with a predetermined value $A_1$ results in $A \geq A_1$ when said detecting means detects actuation of said electronic flash device.

17. A light source discriminating device for use with an image taking apparatus for taking a scene to record the scene on a recording medium, said device comprising:

a clock for specifying a time when said scene is taken; and means for judging whether said time of said scene specified by said clock is within a predetermined time zone.

18. A light source discriminating device as defined in claim 17, wherein during said time zone a color temperature of daylight is low.

19. A light source discriminating device as defined in claim 18, wherein said time zone is set to be early evening before sunset.

20. A light source discriminating device as defined in claim 19, further comprising:

calendar means for specifying a day of the year when said scene is taken; and means for changing said time zone in correlation with said day of the year specified by said calendar means.

21. A light source discriminating device for use with an image taking apparatus for taking a scene to record the scene on a recording medium, said device comprising:

calendar means for specifying a day of the year when said scene is taken; and means for judging whether said day of the year specified by said calendar means is within a predetermined time of the year.

22. A light source discriminating device as defined in claim 22, wherein during said time of the year a color temperature of daylight is low.

23. A light source discriminating device as defined in claim 22, wherein said term is set to be the season of winter.

* * * * *